(12) United States Patent
Wennersten et al.

(10) Patent No.: US 11,448,752 B2
(45) Date of Patent: Sep. 20, 2022

(54) METHOD, A COMPUTER PROGRAM PRODUCT, AN APPARATUS AND A FREQUENCY-MODULATED CONTINUOUS-WAVE RADAR SYSTEM

(71) Applicant: Axis AB, Lund (SE)

(72) Inventors: Johan Wennersten, Lund (SE); Adham Sakhnini, Lund (SE)

(73) Assignee: Axis AB, Lund (SE)

( * ) Notice: Subject to any disclaimer, the term of this patent is extended or adjusted under 35 U.S.C. 154(b) by 10 days.

(21) Appl. No.: 17/092,387

(22) Filed: Nov. 9, 2020

(65) Prior Publication Data
US 2021/0149042 A1    May 20, 2021

(30) Foreign Application Priority Data
Nov. 15, 2019 (EP) .................................. 19209487

(51) Int. Cl.
*G01S 13/89* (2006.01)
*G01S 7/35* (2006.01)

(52) U.S. Cl.
CPC .............. *G01S 13/89* (2013.01); *G01S 7/352* (2013.01); *G01S 7/356* (2021.05)

(58) Field of Classification Search
CPC ...... G01S 13/42; G01S 13/931; G01S 13/584; G01S 7/354; G01S 7/352; G01S 7/356;
(Continued)

(56) References Cited

U.S. PATENT DOCUMENTS 6,028,549 A    2/2000   Buckreuss et al.
6,121,918 A    9/2000   Tullsson
(Continued)

FOREIGN PATENT DOCUMENTS

EP    3173812 B1    1/2021

OTHER PUBLICATIONS

M. He, Y. Nian, X. Wang, Y. Li and S. Xiao, "Polarimetric extraction technique of atmospheric targets based on double sLdr and morphology," 2011 IEEE International Geoscience and Remote Sensing Symposium, Vancouver, BC, 2011, pp. 3245-3248.
(Continued)

*Primary Examiner* — Olumide Ajibade Akonai
(74) *Attorney, Agent, or Firm* — Volpe Koenig

(57) ABSTRACT

A method for producing an interference reduced radar image comprises receiving a measured sequence of beat signals; identifying one or more interference segments within the measured sequence of beat signals, an interference segment being a segment subject to an interference; doctoring the measured sequence of beat signals by creating a doctored representation of the measured sequence of beat signals in the form of a matrix Y; creating a doctoring mask representing the doctoring of the measured sequence of beat signals, the doctoring mask being a matrix M; and estimating a reconstructed range-doppler image $\hat{X}$ from Y and M, wherein the reconstructed range-doppler image is a range-doppler image of Y which is deconvolved using M; such that doctoring the measured sequence of beat signals at least partially removes interference effects and estimating a reconstructed range-doppler image at least partially removes image artefacts created by the doctoring.

15 Claims, 14 Drawing Sheets

(58) Field of Classification Search
CPC .......... G01S 7/023; G01S 7/414; G01S 13/34; G01S 7/4876; G01S 7/497; G01S 13/89; H04B 1/1676
See application file for complete search history.

(56) References Cited

U.S. PATENT DOCUMENTS

| | | | |
|---|---|---|---|
| 6,810,342 B1* | 10/2004 | Gulden | G01S 7/352 342/195 |
| 7,403,153 B2 | 7/2008 | Kelly, Jr. et al. | |
| 8,094,063 B1* | 1/2012 | Cammerata | G01S 13/582 342/25 R |
| 8,169,361 B2 | 5/2012 | Yamano et al. | |
| 2012/0280854 A1 | 11/2012 | Corbett et al. | |
| 2014/0219552 A1 | 8/2014 | Porikli et al. | |
| 2019/0113600 A1 | 4/2019 | Melzer et al. | |
| 2019/0242972 A1* | 8/2019 | Melzer | G01S 13/93 |
| 2020/0142048 A1* | 5/2020 | Shayovitz | G01S 13/449 |
| 2020/0142187 A1* | 5/2020 | Hu | G02B 27/0006 |

OTHER PUBLICATIONS

Extended European Search Report dated May 14, 2020 for the European Patent Application No. 19209487.8.
Korean Office Action dated Jul. 12, 2022 for Korean Patent Application No. 10-2020-0131631.
Kobayashi et al., "Study on detection error generation mechanism and threshold design in FMCW radar applying zero insertion interpolation interference suppression method," IEICE Technical Report, Japan, IEICE, Sun, vol. 118, No. 200, pp. 1-6, ISSN: 0913-5685 (Aug. 23, 2018).
Notice of Reasons for Refusal dated Apr. 12, 2022 for Japanese Patent Application No. 2020-186310.

* cited by examiner

METHOD, A COMPUTER PROGRAM PRODUCT, AN APPARATUS AND A FREQUENCY-MODULATED CONTINUOUS-WAVE RADAR SYSTEM

TECHNICAL FIELD

The present invention relates, in general, to radar imaging and, more particularly, to producing interference reduced radar images.

BACKGROUND

Using radar for surveillance monitoring and in vehicles becomes more and more popular as this allows the distance, velocity, and angle of objects to be measured. For example, a radar unit may be used as a complement to a surveillance camera to provide information about objects in a scene.

One type of radar is the frequency-modulated-continuous-wave (FMCW) radar. The FMCW radar transmits a radar wave signal called a "chirp". A chirp is a periodic signal, often a sinusoid, whose frequency changes, often linearly, with time. The FMCW radar receives, e.g. by a receiver antenna, a reflection of the radar wave signal, the reflection e.g. coming from a moving object in the scene. By mixing the transmitted signal with the received signal, a beat signal may be produced. The process may be repeated sequentially to produce a sequence of beat signals. The sequence of beat signals may subsequently be converted to a range-doppler image comprising e.g. information of the distance to the object and the velocity of the object. The FMCW radar often transmits a sequence of chirps and then stays silent for a while before transmitting a new sequence of chirps. Thus, several sequences of beat signals may be received wherein each sequence of beat signals may be referred to as a frame, the frame corresponding to a snapshot in time of the scene. FMCW radar systems often comprise several receiver antennas. When at least two antennas are used the angle to the object may also be estimated.

Although current radar systems have many advantages there is room for improvements.

SUMMARY

As the use of radars becomes more common, there is an increasing risk that different radars start to interfere with each other. To exemplify, a radar used to monitor traffic may be subject to interference from radars mounted in vehicles passing by. As a consequence of the interference, the function of the radar may worsen or completely fail in worst case.

Providing a way of reducing interference in radar images from FMCW radar systems would be beneficial. Additionally, providing radar images that enable high probability of target detection and low probability of false target detections would also be beneficial.

These and other advantages are at least partly met by the invention as defined in the independent claims. Preferred embodiments are set out in the dependent claims.

According to a first aspect, there is provided a method for producing an interference reduced radar image, the method comprising:

receiving a measured sequence of beat signals, each beat signal comprising a number of segments, each segment having an amplitude, wherein the ith segment of the jth beat signal is identifiable as a segment i,j with amplitude $A_{i,j}$, wherein i=1, ..., a, j=1, ..., b;

identifying one or more interference segments within the measured sequence of beat signals, an interference segment being a segment subject to an interference;

doctoring the measured sequence of beat signals by creating a doctored representation of the measured sequence of beat signals in the form of a matrix Y with elements $y_{i,j}$:

$$Y = \begin{bmatrix} y_{1,1} & \cdots & y_{1,b} \\ \vdots & \ddots & \vdots \\ y_{a,1} & \cdots & y_{a,b} \end{bmatrix},$$

wherein $y_{i,j} = m_{i,j} \times A_{i,j}$, wherein $m_{i,j}$ is a masking value, the masking value being dependent on whether segment i,j is identified as an interference segment or not, the masking value being set to a lower value if segment i,j is an interference segment compared to if it is not an interference segment;

creating a doctoring mask representing the doctoring of the measured sequence of beat signals, the doctoring mask being a matrix M with elements $m_{i,j}$:

$$M = \begin{bmatrix} m_{1,1} & \cdots & m_{1,b} \\ \vdots & \ddots & \vdots \\ m_{a,1} & \cdots & m_{a,b} \end{bmatrix};$$

and estimating a reconstructed range-doppler image $\hat{X}$ from Y and M, wherein the reconstructed range-doppler image is a range-doppler image of Y which is deconvolved using M, a range-doppler image being a time-frequency transform of a representation of a sequence of beat signals;

such that doctoring the measured sequence of beat signals at least partially removes interference effects and estimating a reconstructed range-doppler image at least partially removes image artefacts created by the doctoring.

FIG. 1 schematically illustrates a measured sequence of beat signals 1 from a frequency-modulated continuous-wave radar system. The measured sequence of beat signals 1 comprises a sequence of b beat signals 2 each having a segment 3. A segment 3 may herein be a time sample of a beat signal representing the amplitude of the beat signal at the time the time sample was recorded. The b beat signals 2 are organized next to each other along the horizontal axis of FIG. 1, starting with the first signal. A certain beat signal may be identified by its beat signal index j, wherein 1≤j≤b. The segments 3 of each beat signal 2 are arranged along the vertical axis. A certain segment may be identified by its segment index i, wherein 1≤i≤a.

If the radar system is subject to interference, e.g. interference from a conflicting radar system, some of the segments will have an incorrect amplitude, e.g. an amplitude not reflecting the amplitude that would be expected if the radar system had been acting alone, without any conflicting radar systems around. Some segments in the measured sequence of beat signals 1 may thus be interference segments 4. An interference segment 4 may e.g. be a segment with an amplitude that is more related to the transmitter amplitude of a conflicting radar system than the amplitude of a radar reflection caused by the radar system itself.

The sequence of beat signals 1 may be converted into a range-doppler image by a time-frequency transform. One way of doing this is a Fourier transform, e.g. a 2D Fourier transform. For example, a discrete Fourier transform (DFT) may be performed on each column to create a new matrix followed by a DFT for each row of the new matrix to form the range-doppler image.

Each pixel in the range-doppler image may be seen as an amplitude corresponding to the signal of the returned echo at that range-doppler-bin. The amplitude may herein be a complex value. When the range-doppler image is presented graphically the absolute value of the amplitude may be presented, i.e. the signal strength of the returned echo at that range-doppler-bin. The range-doppler image may thus be a two-dimensional image with range and doppler at the respective axes and pixel values being the corresponding reflection signal strengths.

In the following, FIGS. 2-5 will be used to introduce a selection of concepts, exemplify some of problems that may arise when a range-doppler image is created, and to exemplify some of the advantages of the inventive concept. The examples of FIGS. 2-5 should however not be construed as limiting to the scope of the claimed subject matter. The data used in FIGS. 2-5 is simulated data rather than measured data. However, it should be understood that any described operation referring to simulated data can, in a corresponding way, refer to measured data.

FIGS. 2A and 2B illustrate a simulation of a measured sequence of beat signals 1 without interference. FIG. 2B illustrates one single beat signal 2. The x-axis of FIG. 2B is a segment index representing a number of segments. The y-axis of FIG. 2B is an amplitude of a beat signal. The amplitude of the beat signal may vary from segment to segment, as shown in FIG. 2B. The absolute amplitude of one segment may represent a signal power level measured of the sample of the beat signal.

FIG. 2A illustrates the entire simulated sequence of beat signals 1 without interference in the form of a grayscale image. The x-axis of FIG. 2A is a beat signal index representing a number of beat signals. The y-axis of FIG. 2A is a segment index representing a number of segments of each beat signal. In FIG. 2A, the beat signals are organized next to each other along the x-axis, starting with the first beat signal 1. The segments of each beat signal are arranged along the y-axis. Thus, each column of FIG. 2A corresponds to a beat signal of the type presented in FIG. 2B. In the grayscale image of FIG. 2A the real part of each segment is represented as a grayscale value on a decibel scale.

FIG. 2C illustrates a range-doppler image created from the measured (simulated) sequence of beat signals of FIG. 2A. In the range-doppler image, moving objects will be represented by groups of pixels of an increased intensity. An intensity of each pixel of the range-doppler image may represent an energy level of a signal, and may basically represent an ability of the object to reflect the radar signal. The intensity is in this figure presented in grayscale corresponding to the scale bar on the right-hand side. Notably, the x-axis of FIG. 2C represents a measure of velocity, and the y-axis of FIG. 2C represents a measure of distance from the receiver. Consequently, each pixel of a range-doppler image represents a certain velocity and a certain distance from the receiver. The higher the intensity of the pixel, the higher the energy level of the signal. The lower the intensity of the pixel, the lower the energy level of the signal. In the range-doppler image of FIG. 2C there are three moving objects standing out from the background noise floor. The noise floor in this case corresponding to a grayscale with a value of −160.0 dB and the signal to noise ratio (SNR) being 42.3 dB.

FIGS. 3A and 3B illustrate a simulation of a measured sequence of beat signals 1 with interferences, where the interferences give rise to several interference segments 4. FIG. 3A illustrates the entire measured (simulated) sequence of beat signals 1 with interferences in the form of a grayscale image. FIG. 3B illustrates one single beat signal 2 of the simulated sequence of beat signals with interferences. The interferences are seen as interference segments 4 in the different beat signals 2. In the measured (simulated) sequence of beat signals 1 of this example the interference segments 4 form a diagonal pattern. FIG. 3C illustrates a range-doppler image created from the measured (simulated) sequence of beat signals of FIG. 3A. The data used for the simulation of FIG. 3 as well as the presentation of the data are analogous to the simulation of FIG. 2 with the exception of the introduction of the interferences. In FIGS. 3A-C, it can be seen that interferences may raise the noise floor. In this case the noise floor is raised to a value of −148.6 dB and the SNR becomes 31.3 dB. The added noise may e.g. obscure true objects (true reflections), the added noise may also rise to false objects, making it difficult for a human operator or machine to interpret the resulting radar image. In the example of FIG. 3C the object previously visible at about the coordinate [95, 55] in the radar image of FIG. 2C now disappears in the background noise.

The adverse effect of the interference may to some extent be mitigated by identifying segments in the measured sequence of beat signals 1 which are subject to interference, and to mask these segments, e.g. by setting them to zero. The sequence of beat signals with interference of FIG. 3A may thus be doctored, e.g. by setting all segments of the sequence of beat signals subject to interferences to zero. It should however be understood that the doctoring also may be done differently. For example, the amplitude of all segments of the sequence of beat signals subject to interferences may be reduced by a percentage, e.g. 90%. The doctoring may also affect segments which are not subject to interference. The doctoring may e.g. reduce the amplitude of segments adjacent to, or near, an identified interference segment. This may be done as a precautionary measure since the identification step may not necessarily be perfect.

FIGS. 4A-4C illustrate the doctoring of the simulation from FIGS. 3A-3C. A doctored representation 6 of the measured (simulated) sequence of beat signals is created by setting identified interference segments to zero. FIG. 4A illustrates the entire doctored representation 6 of the measured sequence of beat signals, in matrix format referred to as Y, in the form of a grayscale image. FIG. 4B illustrates one single beat signal after the doctoring. FIG. 4C illustrates a range-doppler image 20 of Y, i.e. a range-doppler image created from the doctored representation of the measured sequence of beat signals of FIG. 4A.

The range-doppler image resulted from the doctored sequence of beat signals, presented in FIG. 4C, is not as noisy as the range-doppler image resulted from the sequence of beat signals with interferences before doctoring, presented in FIG. 3C. It appears that the noise floor is reduced to −160.6 dB in FIG. 4C and the SNR is changed to 40.9 dB. Thus, by setting segments of a sequence of beat signals subject to interferences to zero, the range-doppler image resulted from the doctored sequence of beat signals may become cleaner than the range-doppler image resulted from the sequence of beat signals before doctoring, in terms of background noise. Consequently, the differences in intensity levels between the groups of pixels representing the objects to be identified and the background noise may become bigger in the radar image of FIG. 4C. Thus, it may become easier to identify objects in the radar image resulted from the doctored sequence of beat signals with interferences.

However, although the range-doppler image of FIG. 4C is cleaner (in terms of a reduced noise floor) than the range-doppler image of FIG. 3C, there are artefacts in the radar image of FIG. 4C, seen as diffraction spikes extending from the object to be identified at about the coordinates [45, 235] and [75, 205].

It is a realization of the invention that artefacts, similar to those in FIG. 4C, can erroneously be interpreted as objects which in reality do not exist in the scene, thus the artefacts may form ghost objects. It is a further realization of the invention that artefacts, similar to those in FIG. 4C, can obscure real objects. Interpreting artefacts as ghost objects or not identifying real objects which are obscured by an artefact may be particularly problematic when the range-doppler image is automatically interpreted by a machine, as oppose to by a human operator.

It is a further realization that the artefacts may be predicted, and once they have been predicted they may be located and removed from a resulting range-doppler image.

FIGS. 5A-5C illustrate the doctoring of the measured (simulated) sequence of beat signals in FIG. 4.

FIG. 5A illustrates the doctoring mask 8 representing the doctoring of the measured (simulated) sequence of beat signals in FIG. 4A. As previously mentioned the doctoring mask 8 is referred to as M in matrix format. FIG. 5A is a binary image where white areas represents masking value 0, i.e. segments which were set to zero in FIG. 4A and black areas represent masking value 1, i.e. segments which were not masked at all in FIG. 4A.

FIG. 5B illustrates a range-doppler image derived from the binary image of FIG. 5A. The range-doppler image of FIG. 5B may be generated by subjecting the doctoring mask of FIG. 5A to the same radar signal processing, e.g. Fourier transform, as the range-doppler images of FIGS. 2C, 3C and 4C were subjected to.

In the radar image of FIG. 5B, an artefact, in the shape of diffraction spikes, is seen centrally in the image. As can be seen, the artefact is similar to the artefacts of the three objects in FIG. 4C. Thus, the generated image of the doctoring mask in FIG. 5A may predict the artefacts in the resulted range-doppler image caused by the doctored sequence of beat signals. The range-doppler image of Y in FIG. 4C can be thought of as a correct but unknown range-doppler image which is convolved with the range-doppler image of the doctoring mask M.

It may not be possible to reconstruct the correct range-doppler image completely as some information may be irrevocably obscured by the interference. However, it is a realization of the invention that an estimate of the reconstructed range-doppler image, wherein the estimate of the reconstructed range-doppler image is a range-doppler image of Y which is deconvolved using M, may provide an image which is more likely to be interpreted correctly by humans and/or machines than other estimates of the reconstructed range-doppler image. FIG. 5C illustrates such an estimate of the reconstructed range-doppler image 22. The noise floor in FIG. 5C is −169.9 dB and the SNR is 48.5 dB.

Comparing FIG. 5C to FIG. 3C it is apparent that the estimate of the reconstructed range-doppler image 22 may have less background noise than a range-doppler image derived directly from a sequence of beat signals with interferences without any doctoring. Furthermore, comparing to FIG. 4C it is apparent that that the estimate of the reconstructed range-doppler 22 image may remove artefacts that the doctoring may cause.

An estimate of a reconstructed range-doppler image which is likely to be interpreted correctly, by humans and/or machines, enable a high probability of target detection and a low probability of false target detections. For example, a small target, e.g. a pedestrian, which is close to a large target, e.g. a slow moving car in the vicinity of the pedestrian, may be detected in the estimate of a reconstructed range-doppler image without being obscured, neither by noise nor by diffraction spices from the larger target.

A measured beat signal may be a signal derived from the mixing of a transmitted radar signal and a received radar signal. The measured sequence of beat signals may e.g. be a sequence of beat signals constituting one measured frame.

Furthermore, it should be understood that identifying an interference segment may be done in many different ways. For example, interference segments may be identified by comparing a beat signal to a reference beat signal. It is likely that a radar signal from a conflicting radar system is offset in time or has a slightly different repetition frequency compared to the measuring radar system. Consequently, in a measured sequence of beat signals different beat signals are likely to be disturbed in different segments. The interference segments may e.g. be diagonally arranged in the sequence of beat signals. Therefore, the interference segments of the beat signals will have little impact on an average or a median calculated with respect to corresponding segments of the different beat signals within the sequence. Thus, the reference beat signal may be calculated as an average or a median of one or more of the beat signals in the sequence of beat signals. If the difference between an amplitude of a segment in the beat signal and an amplitude in a corresponding segment in the reference beat signal is above a threshold the segment may be identified as an interference segment. If consecutive beat signals are compared to the reference beat signal a derivative of the difference may be calculated. If the derivative of the difference is above a threshold the segment may be identified as an interference segment. The derivative may be e.g. the first derivative, the second derivative, the third derivative, etc.

It should be understood that more than one interference segments may be identified within a single beat signal. It should also be understood that in some beat signals there may be no interference segments. It should be understood that identification of interference segments may be done on the fly. As each new beat signal is measured it may e.g. be compared to a reference beat signal and interference segments may be identified. Thus, each column of Y and each column of M may be created as each new measured beat signal becomes available. The identification may thus be done before the entire sequence is measured. It should also be understood that a number of measured beat signals may first be collected in one measured sequence of beat signals before the identification is done. For example, the entire measured sequence of beat signals may be represented as a matrix Z with elements $z_{i,j}$:

$$Z = \begin{bmatrix} z_{1,1} & \cdots & z_{1,b} \\ \vdots & \ddots & \vdots \\ z_{a,1} & \cdots & z_{a,b} \end{bmatrix}.$$

Once Z is created the identification of the interference segments may be performed and M created. Subsequently, Y may be created as Y=M⊙Z, wherein ⊙ refers to a Hadamard product, i.e. elementwise multiplication of the elements in M and Z. In the following Z will be used to refer to the measured sequence of beat signals before the doctoring. However, it should be understood that this is for illustrative purposes only. The method is applicable even if Z is never calculated, if it is calculated on the fly as measured beat signals becomes available, or after the entire sequence of beat signals has been measured.

It should be understood that a masking value may be any decimal number. It should also be understood that a masking value may be any decimal number from 0 to 1. It should also be understood that a masking value may be a number of either 0 or 1.

It should be understood that estimating a reconstructed range-doppler image $\hat{X}$ from Y and M may be done in several different ways. One way may be to solve $$\hat{Y}\hat{M} \circledast \hat{X} \quad \text{(Eq. 1)}$$

where $\hat{M}$ is the Fourier transform of M, $\hat{Y}$ is the Fourier transform of Y and $\circledast$ is a convolution operator. Eq. 1 may have many solutions. For example, $\hat{X}=\hat{Z}$ may be one solution. It should be understood that the solution sought may be a solution where the estimated reconstructed range-doppler image is different from the range-doppler image of the measured sequence of beat signals, e.g. a solution satisfying $\hat{X}\neq\hat{Z}$. It should be understood that within the many solutions of $\hat{X}$ one solution may correspond to the range-doppler image that one obtained from an interference free measured sequence of beat signals without any doctoring. It should also be understood that it may not be possible to find this exact solution. However, another solution may still be an improvement to other estimates of the reconstructed range-doppler image.

The at least one of the one or more interference segments may e.g. be identified by comparing at least one of:
the segment amplitude;
the difference between the segment amplitude and a reference segment amplitude; and,
a derivative of the difference between the segment amplitude and a reference segment amplitude;
to one or more thresholds.

Interference segments may be identified e.g. by finding all elements with an amplitude higher than a threshold. Interference segments may also be identified e.g. by calculating a reference segment amplitude and comparing the difference between the segment amplitude and the reference segment amplitude to a threshold. The reference segment amplitude may e.g. be an average or median of all segments within the measured sequence of beat signals with the same segment index, or a subset of the segments within the measured sequence of beat signals with the same segment index. Interference segments may also be identified e.g. by calculating a derivative of the difference between the segment amplitude and a reference segment amplitude. By comparing the amplitude of two or more segments which are adjacent in time, i.e. having the same segment index but different beat signal indices, a derivative of the difference may be calculated. If the derivative is above a threshold, one or more of the two or more segments may be identified as an interference segment.

These may be computationally efficient ways to identify interference segments.

The step of estimating a reconstructed doppler-range image may e.g. comprise:
finding a first preliminary estimate of a reconstructed range-doppler image $\widehat{X_1}$ from Y and M;
finding a second preliminary estimate of a reconstructed range-doppler image $\widehat{X_2}$ from Y and M;
determining the estimated reconstructed doppler-range image $\hat{X}$ as $\widehat{X_1}$ if M⊙$X_1$ is a better least square approximation to Y than M⊙$X_2$, wherein ⊙ refers to a Hadamard product, wherein $X_1$ is an inverse Fourier transform of $\widehat{X_1}$, and wherein $X_2$ is an inverse Fourier transform of $\widehat{X_2}$.

This facilitates an optimization process. Different estimates $\widehat{X_1}$, $\widehat{X_2}$, $\widehat{X_3}$... may be compared to each other and the best one chosen. For example, $X_1$ and $X_2$ represents the sequence of beat signals that would have given rise to $\widehat{X_1}$ and $\widehat{X_2}$. In the segments that are identified as interference segments it may be impossible to tell whether $X_1$ and $X_2$ are good or bad estimates. However, in the other segments there is potentially accurate measurement data and that date is represented in Y. Thus, if the interference segments in $X_1$ and $X_2$ are masked the same way as the raw data was (even though the corresponding segments in $X_1$ and $X_2$ may contain no interference) the rest of the segments may be compared to Y. This may be implemented by e.g. calculating M⊙$X_1$ and M⊙$X_2$ and comparing these matrices with Y in a least square sense. For example, each element of M⊙$X_1$ and M⊙$X_2$ may be compared to the corresponding element of Y and a residual may be calculated. The sum of the squared residuals (weighted or un-weighted) may be calculated for M⊙$X_1$ and M⊙$X_2$ The smallest sum may represent the best solution.

The reconstructed range-doppler image $\hat{X}$ may be a range-doppler image of Y which is deconvolved with M using a Wiener deconvolution.

The Wiener deconvolution is a deconvolution method which avoids division by elements close to zero. Wiener deconvolution may therefore be particularly suitable for restauration of noisy range-doppler images. Wiener deconvolution may also be particularly suitable for restauration of range-doppler images derived from a doctored representation of the measured sequence of beat signals where some segments have been masked by lowering the amplitude with a masking value.

The method may further comprise setting a masking value $m_{i,j}$ to a minimum value if segment i,j is identified as an interference segment, wherein the minimum value is a minimum value of the matrix M.

The minimum value may herein be the value in the matrix M which is closest to zero. A masking value set to a minimum value may ensure that the interference segment is attenuated more than segments which are not identified as interference segments.

It should be understood that the minimum value may also be zero. Thus, the masking value for at least some interference segments may be set to zero such that these segments are completely masked in the doctoring process. It may be so that these interference segments do not contain any relevant information about the scene. It may then be advantageous to set the amplitude of these interference segments to zero.

It should also be understood that all masking values corresponding to segments which are identified as interference segments may be set to the same minimum value.

This may be advantageous e.g. when none of the interference segments contain any relevant information about the scene.

The method may further comprise setting a masking value $m_{i,j}$ to a maximum value if segment i,j is not identified as an interference segment, wherein the maximum value is a maximum value of the matrix M. This may ensure that the rescaling of the amplitude for a non-interference segment is sufficiently different from the rescaling of the amplitude for an interference segment.

It should be understood that the maximum value may be one. Thus, the masking value for at least some non-interference segments may be set to one such that these segments retain their amplitude after the doctoring.

It should also be understood that all masking values corresponding to segments which are not identified as interference segments may be set to the same maximum value. It may be advantageous treat all non-interference segments the same way in order not to introduce new artefacts.

The masking values may be configured to form at least one window function in the matrix M, wherein the window function comprises either:
the elements in a row i of the matrix M wherein one of the elements in the row is an element i,j corresponding to a segment i,j which is identified as an interference segment, the window function being configured to have element values continuously increasing along the row from a minimum value at element i,j to a maximum value at an element corresponding to a segment which is not is identified as an interference segment; or
the elements in a column j of the matrix M wherein one of the elements in the column is an element i,j corresponding to a segment i,j which is identified as an interference segment, the window function being configured to have element values continuously increasing along the column from a minimum value at element i,j to a maximum value at an element corresponding to a segment which is not is identified as an interference segment.

A window function may provide a smooth transition from a maximum value to a minimum value. This may prevent sharp edges being formed in the doctored representation of the measured sequence of beat signals. Edges herein refer to a sudden change in the amplitude from one segment to another. Sharp edges may make the artefacts that are created by the doctoring more severe. Thus, the use of a window function may improve the quality of the estimated reconstructed doppler-range image. An example of a matrix displaying a window function both along the rows and columns is:

$$M = \begin{bmatrix} 1.0 & 1.0 & 1.0 & 0.5 & 0.0 & 0.5 \\ 1.0 & 1.0 & 0.5 & 0.0 & 0.5 & 1.0 \\ 1.0 & 0.5 & 0.0 & 0.5 & 1.0 & 1.0 \\ 0.5 & 0.0 & 0.5 & 1.0 & 1.0 & 1.0 \\ 0.0 & 0.5 & 1.0 & 1.0 & 1.0 & 1.0 \\ 0.5 & 1.0 & 1.0 & 1.0 & 1.0 & 1.0 \end{bmatrix}$$

The 0.0 masking values herein mask a diagonal section of interference segments, the 1.0 masking values correspond to segments which should retain their amplitude. The 0.5 masking values create a smooth transition 0.0 to 1.0 masking values. The matrix elements with 0.5 masking values may herein correspond to segments which are not identified as interference segments but are located next to an interference segment.

The window function may comprise a Hann window, a Blackman window, a Hamming window, a Bartlett window, or a flat top window. These may be window functions that effectively reduces artefact creation.

The step of estimating a reconstructed range-doppler image $\hat{X}$ from Y and M may comprise:
Fourier transforming Y to form $\hat{Y}$;
Fourier transforming $|\hat{Y}|$ to form $\tilde{Y}$, wherein $|\hat{Y}|$ is the elementwise absolute value of $\hat{Y}$;
Fourier transforming M to form $\hat{M}$;
Fourier transforming $|\hat{M}|$ to form $\tilde{M}$, wherein $|\hat{M}|$ is the elementwise absolute value of $\hat{M}$;
creating an inverse mask G, G being a matrix with elements $g_{u,v}$, wherein each element $g_{u,v}$ is based on element $\hat{m}_{u,v}$ of the matrix $\hat{M}$ and an estimated signal to noise ratio of $\hat{X}$ such that $g_{u,v} \times \hat{m}_{u,v}$ forms a value which is smaller for a small estimated signal to noise ratio than for a large estimated signal to noise ratio; and
setting $\hat{X}$ to be the inverse Fourier transform of $G \odot \hat{Y}$, wherein $\odot$ refers to a Hadamard product.

This may be a computationally efficient way to perform the estimate as it is based on Fourier transforms.

This may also be a way to estimate a reconstructed range-doppler image $\hat{X}$ which is easy to implement in existing radar hardware. Existing radar hardware may e.g. deliver $\hat{Y}$ and $\hat{M}$. Thus, parts of the above estimation of the reconstructed range-doppler may already have been performed. The rest of the estimation may e.g. be performed elsewhere.

The $g_{u,v}$ elements of G may be set to $$g_{u,v} = \hat{m}_{u,v}^* / (|\hat{m}_{u,v}|^2 + R(u,v)),$$

wherein $\hat{m}_{u,v}^*$ denote the complex conjugate of $\hat{m}_{u,v}$, $|\hat{m}_{u,v}|$ denote the absolute value of $\hat{m}_{u,v}$, and $R(u,v)$ is a number which is inversely proportional to the square of the estimated signal to noise ratio of $\hat{X}$ at element u,v.

It should be understood that the estimated signal to noise ratio of $\hat{X}$ may be estimated without knowing $\hat{X}$. It may e.g. be estimated from $\hat{Y}$. It may also be estimated based on previously gathered data in a similar scenario.

According to a second aspect there is provided a computer program product comprising a computer-readable medium storing computer-readable instructions which, when executed on a processing unit, will cause the processing unit to perform the method according to the first aspect.

A computer program product according to the second aspect may have the same advantages, or similar advantages, as a method according to the first aspect encompassed by the claims in this application and may possibly be the subject of a future divisional application.

According to a third aspect there is provided an apparatus for producing an interference reduced radar image, the apparatus comprising a control circuit configured to:
receive a measured sequence of beat signals, each beat signal comprising a number of segments, each segment having an amplitude, wherein the ith segment of the jth beat signal is identifiable as a segment i,j with amplitude $A_{i,j}$, wherein $i=1, \ldots, a$, $j=1, \ldots, b$;
identify at least one interference segment within the measured sequence of beat signals, the interference segment being a segment subject to an interference;
doctor the measured sequence of beat signals by creating a doctored representation of the measured sequence of beat signals in the form of a matrix Y with elements $y_{i,j}$:

$$Y = \begin{bmatrix} y_{1,1} & \cdots & y_{1,b} \\ \vdots & \ddots & \vdots \\ y_{a,1} & \cdots & y_{a,b} \end{bmatrix},$$

wherein $y_{i,j}=m_{i,j} \times A_{i,j}$, wherein $m_{i,j}$ is a masking value, the masking value being dependent on whether segment i,j is identified as an interference segment or not, the masking value being set to a lower value if segment i,j is an interference segment compared to if it is not an interference segment;

create a doctoring mask representing the doctoring of the measured sequence of beat signals, the doctoring mask being a matrix M with elements $m_{i,j}$:

$$M = \begin{bmatrix} m_{1,1} & \cdots & m_{1,b} \\ \vdots & \ddots & \vdots \\ m_{a,1} & \cdots & m_{a,b} \end{bmatrix};$$

estimate a reconstructed range-doppler image $\hat{X}$ from Y and M, wherein the reconstructed range-doppler image is a range-doppler image of Y which is deconvolved using M, a range-doppler image being a time-frequency transform of a representation of a sequence of beat signals which transforms the representation of the sequence of beat signals from a time domain to a frequency domain;

such that doctoring the measured sequence of beat signals at least partially removes interference effects and estimating a reconstructed range-doppler image at least partially removes image artefacts created by the doctoring.

An apparatus according to the second aspect may have the same advantages, or similar advantages, as the first and second aspects encompassed by the claims in this application and may possibly be the subject of a future divisional application.

According to a fourth aspect there is provided a frequency-modulated continuous-wave, FMCW, radar system, comprising a radar unit and an apparatus according to the third aspect, wherein the radar unit comprises:
a transmit antenna configured to transmit a first sequence of signals;
a receive antenna configured to receive a second sequence of signals in response to the first sequence of signals transmitted by the transmit antenna; and
a mixer configured to mix the first sequence of signals and the second sequence of signals to generate a sequence of beat signals;
the radar unit being configured to deliver the sequence of beat signals to the apparatus as a measured sequence of beat signals, such that the apparatus produces the interference reduced radar image.

A FMCW radar system according to the fourth aspect may have the same advantages, or similar advantages, as the first, second and third aspects encompassed by the claims in this application and may possibly be the subject of a future divisional application.

A FMCW radar system according to the fourth aspect may be a cost-effective radar system. In conventional radar systems several receiver antennas may be used to mitigate interference effects. With multiple antennas, spatial nulls may be applied towards the directions of interference. However, this implies large blind regions, wherein the blind regions are larger when fewer receiver antennas are used. Thus, for a satisfactory performance the conventional FMCW radar system may need many receiver antennas. This may be expensive both in terms of hardware cost and in terms of computational burden. By mitigating interference effects using an apparatus according to the third aspect, fewer antennas may be needed which may relieve some of the cost.

BRIEF DESCRIPTION OF THE DRAWINGS

The above, as well as additional objects, features and advantages will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description are described thereinafter according to a preferable embodiment, being not used to limit the claimed scope. The teachings may be embodied in many different forms and should not be construed as limited to the embodiments set forth herein; rather, these embodiments are provided for thoroughness and completeness, and fully convey the scope of the teachings to the skilled person.

Figure 6:
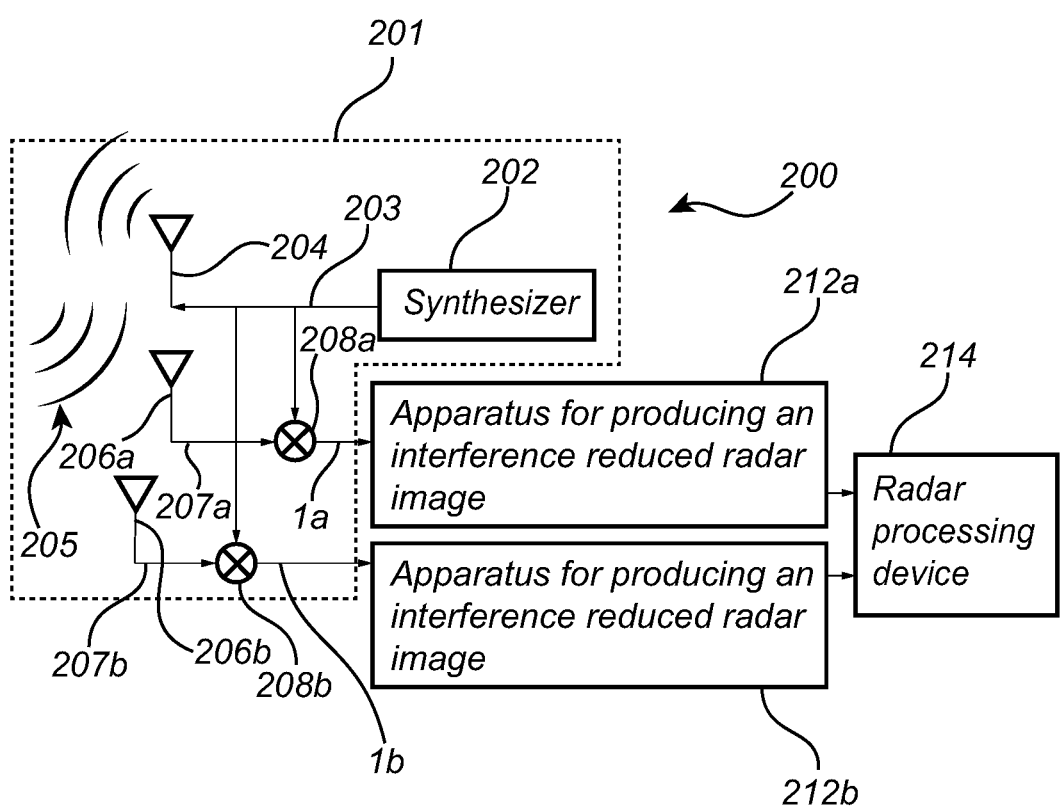
FIG. 6 is a FMCW radar system.

FIG. 6 illustrates a FMCW radar system 200. The radar system 200 may be used as a complement to a video camera. For example, the radar system 200 may be included in a video camera. The radar system 200 comprises a radar unit 201 and one or more apparatuses for producing an interference reduced radar image 212a, 212b. The radar system may also comprise a radar processing device 214. The radar unit 201 comprises one or more transmit antennas 204, one or more receive antennas 206a, 206b, and one or more mixers 208a, 208b. The radar unit 201 may also comprise a synthesizer 202.

The transmit antenna 204 is configured to transmit sequences of signals. The sequences of signals may be transmitted in frames. For example, the transmit antenna 204 may send out a sequence of signals in a first frame. Then the transmit antenna 204 may be silent for a while before sending out a further sequence of signals in a second frame.

In particular, the transmit antenna 204 may send out a first sequence of signals 203. The first sequence of signals 203 may correspond to the first frame. The first sequence of signals 203 may be generated by the synthesizer 202. Each signal in the first sequence 203 may be a sinusoid whose frequency increases linearly with time—each signal may be referred to as a chirp.

The signals in the transmitted first sequence of signals 203 are reflected off objects in the scene. The reflected signals 205 are then received by each receive antenna 206a, 206b at different angles. Each receive antenna 206a, 206b hence receives a second sequence of signals 207a, 207b in response to the first sequence of signals 203 transmitted by the transmit antenna 204. In addition to the reflected signals 205, the receive antennas 206a, 206b may receive signals which are transmitted from transmitters which are not part of the radar unit 201, such as transmitters of other radar units. Those signals will be superposed with the reflected signals 205 at the receive antennas 206a, 206b. Each received sequence of signals 207a, 207b may hence have a component stemming from the reflected signals 205, and another component stemming from interfering transmitters. Here two receive antennas 206a, 206b are illustrated. In practice, however, the radar system 200 may have any number of receive antennas.

Figure 1:
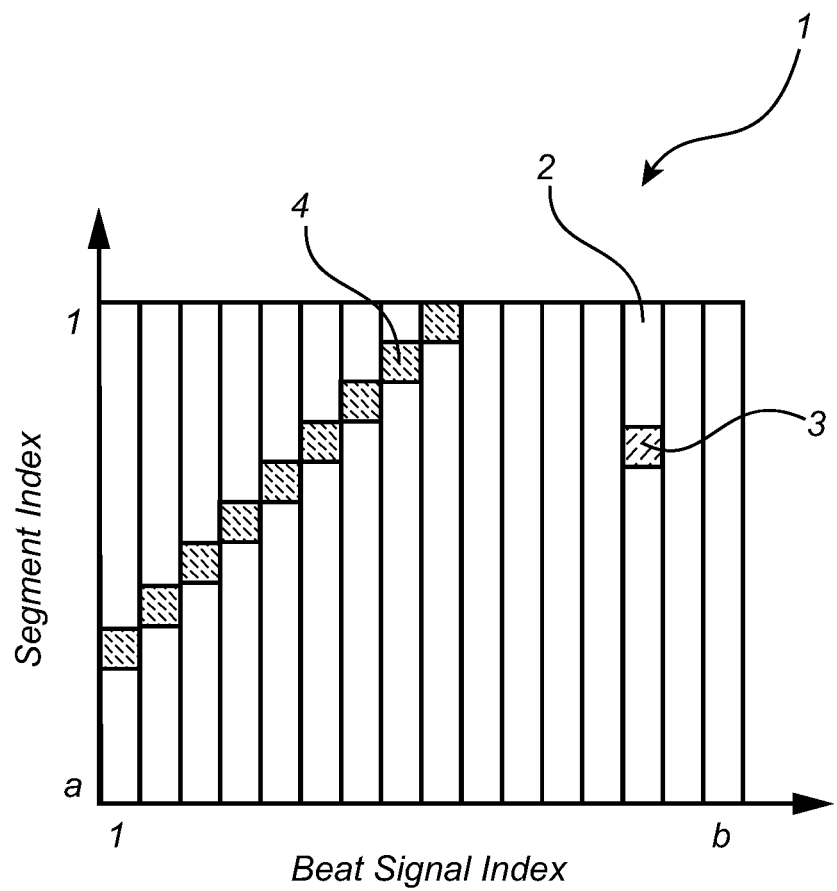
FIG. 1 is a schematic illustration of a measured sequence of beat signals.
Figure 2A:
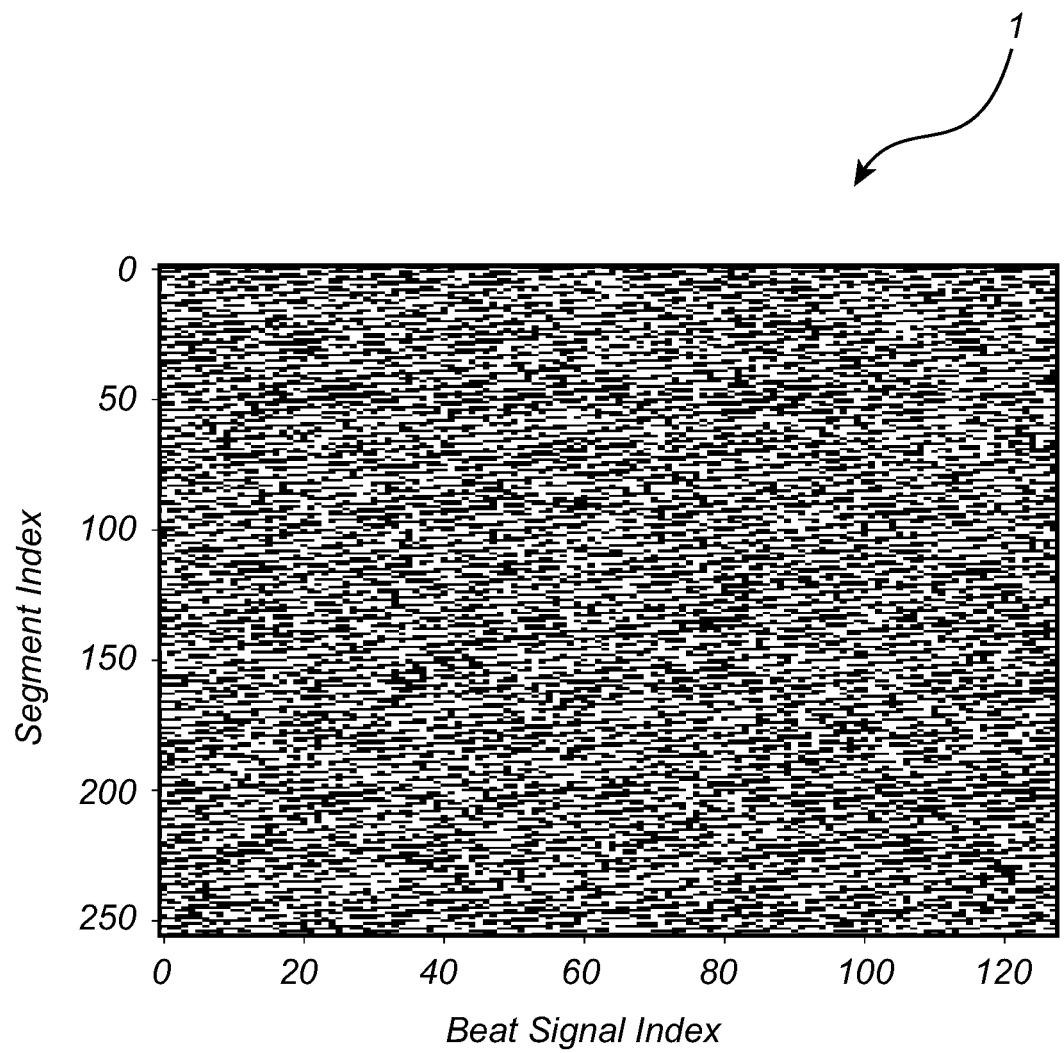
FIG. 2A is a sequence of beat signals without interferences.
Figure 2B:
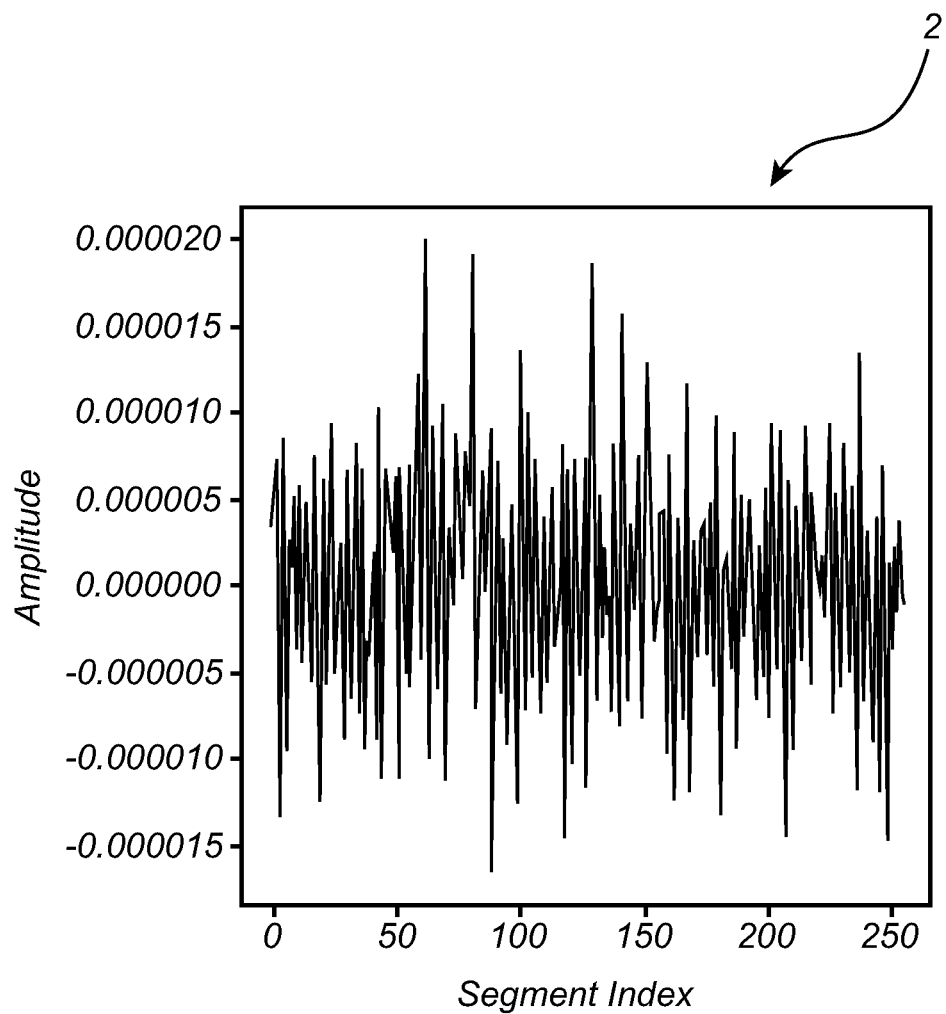
FIG. 2B is a single beat signal without interferences.
Figure 2C:
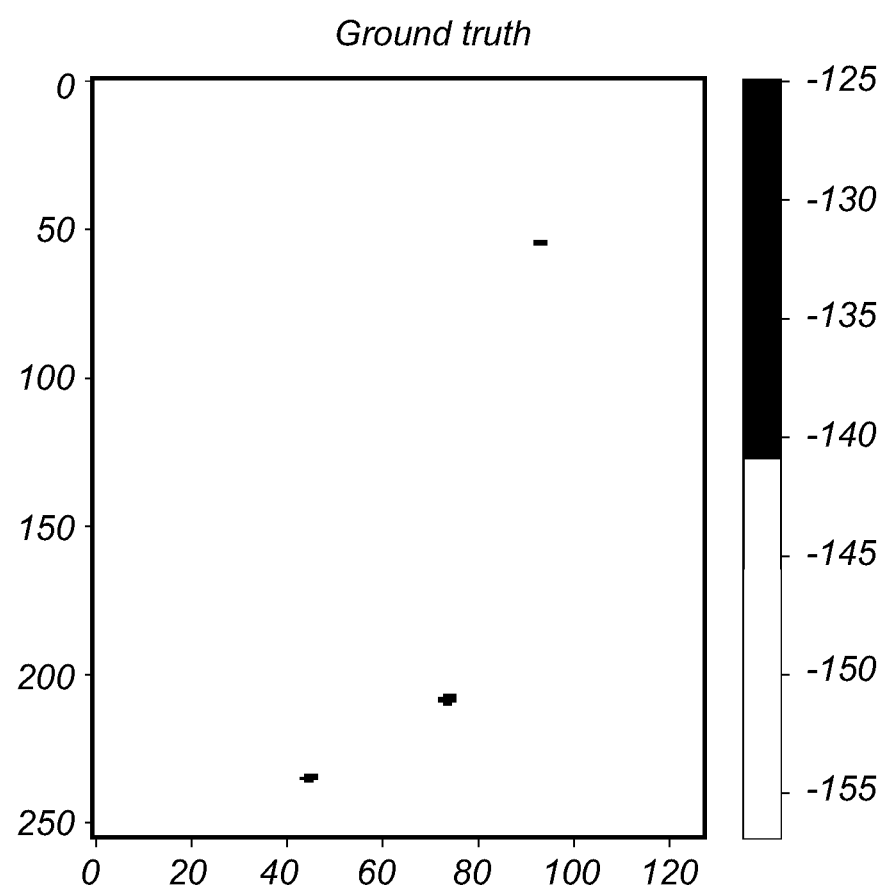
FIG. 2C is a range-doppler image created from the sequence of beat signals without interferences.
Figure 3A:
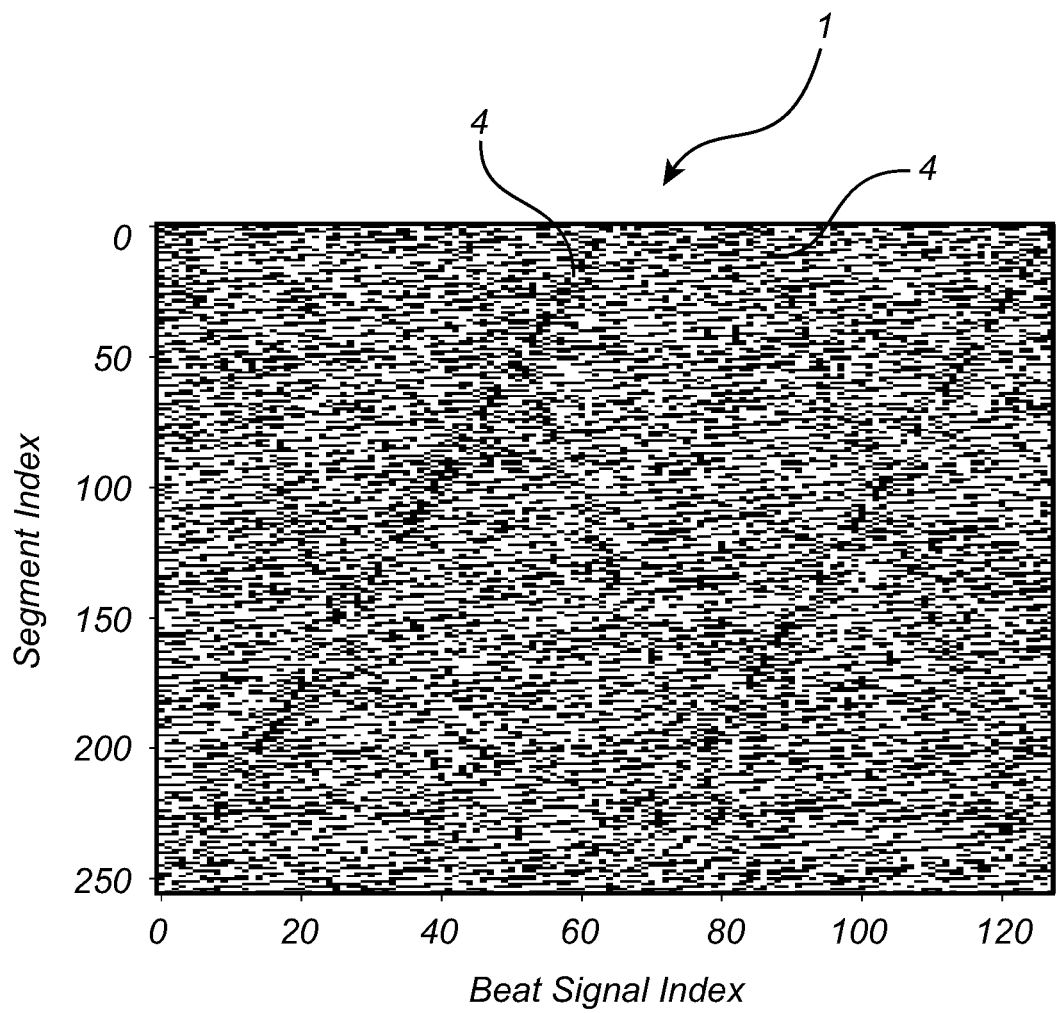
FIG. 3A is a sequence of beat signals with interferences.
Figure 3B:
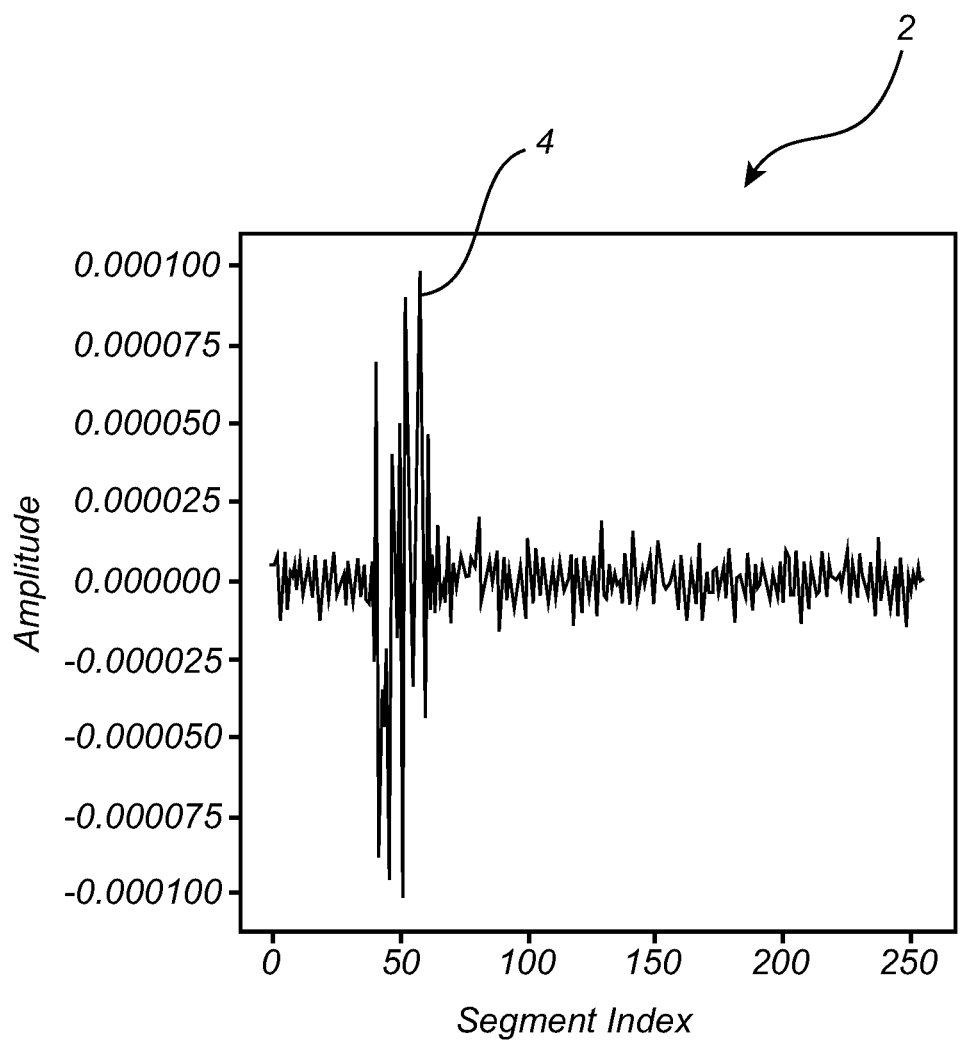
FIG. 3B is a single beat signal with interferences.
Figure 3C:
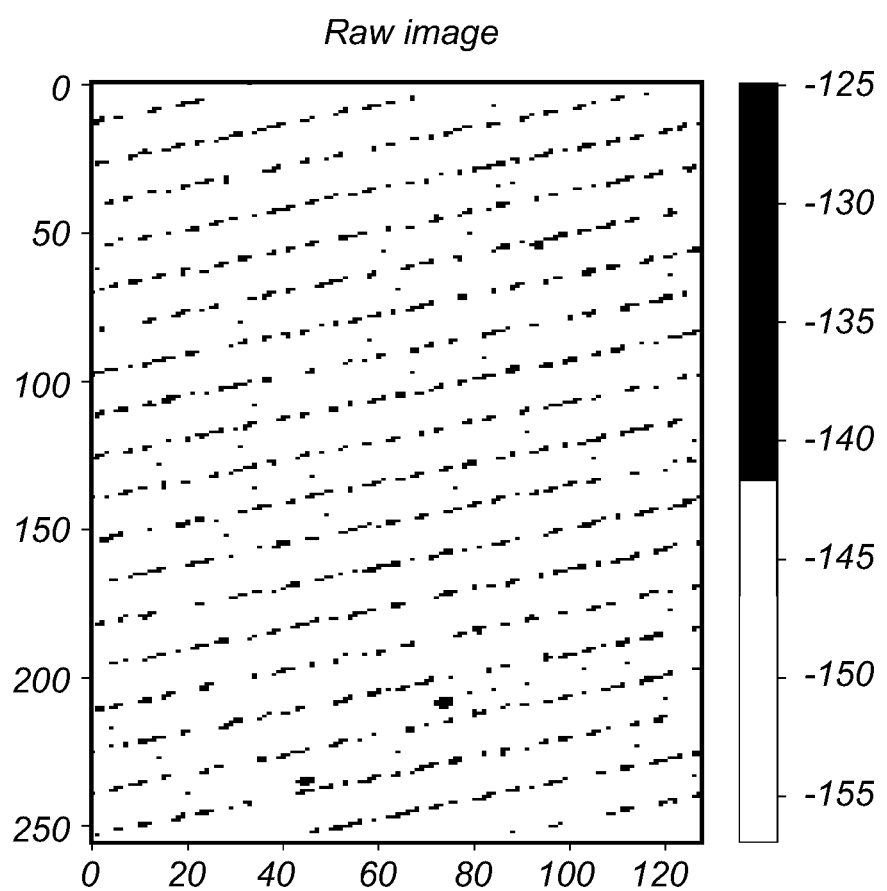
FIG. 3C is a range-doppler image created from the sequence of beat signals with interferences.
Figure 4A:
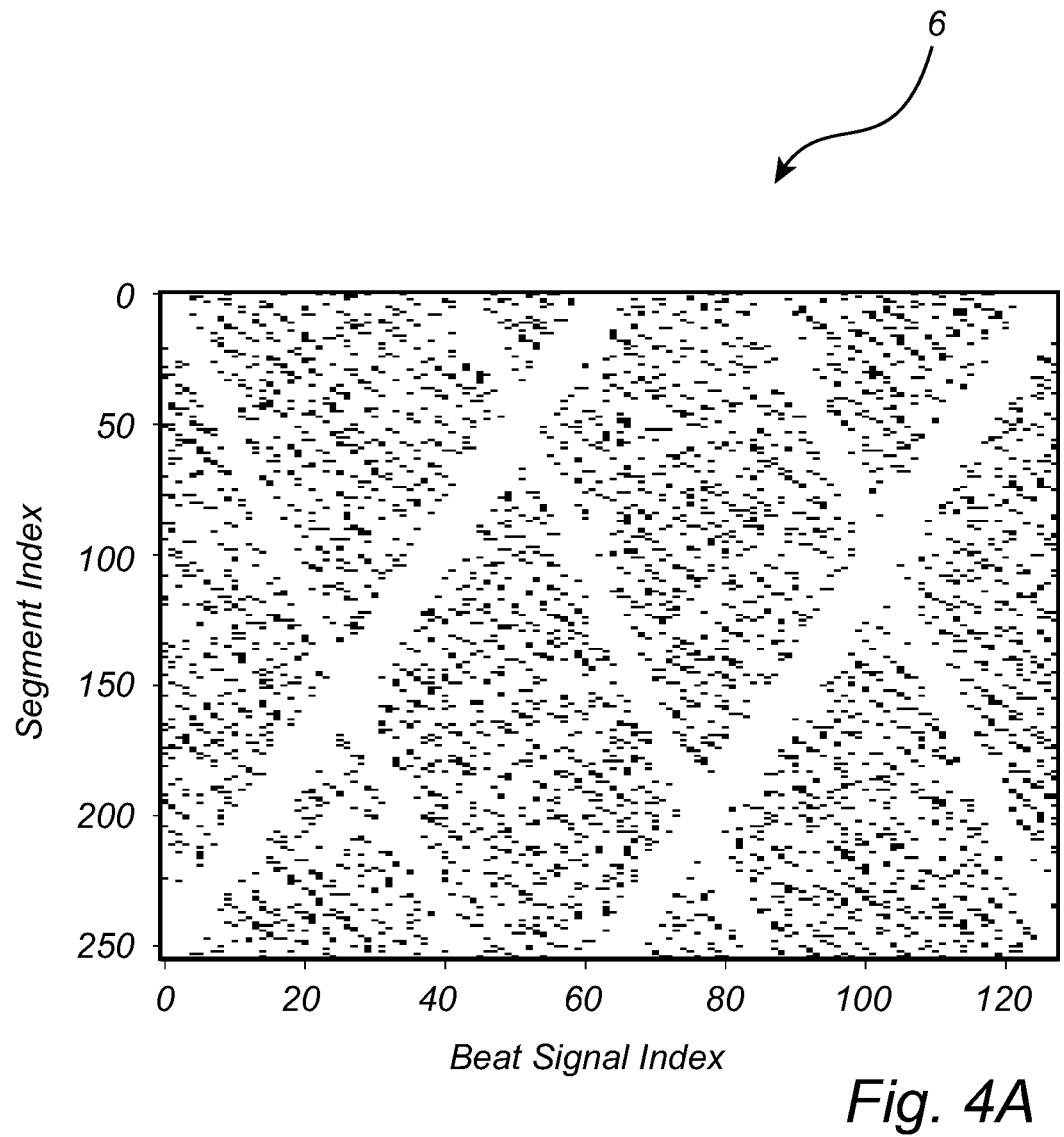
FIG. 4A is a doctored representation of a sequence of beat signals.
Figure 4B:
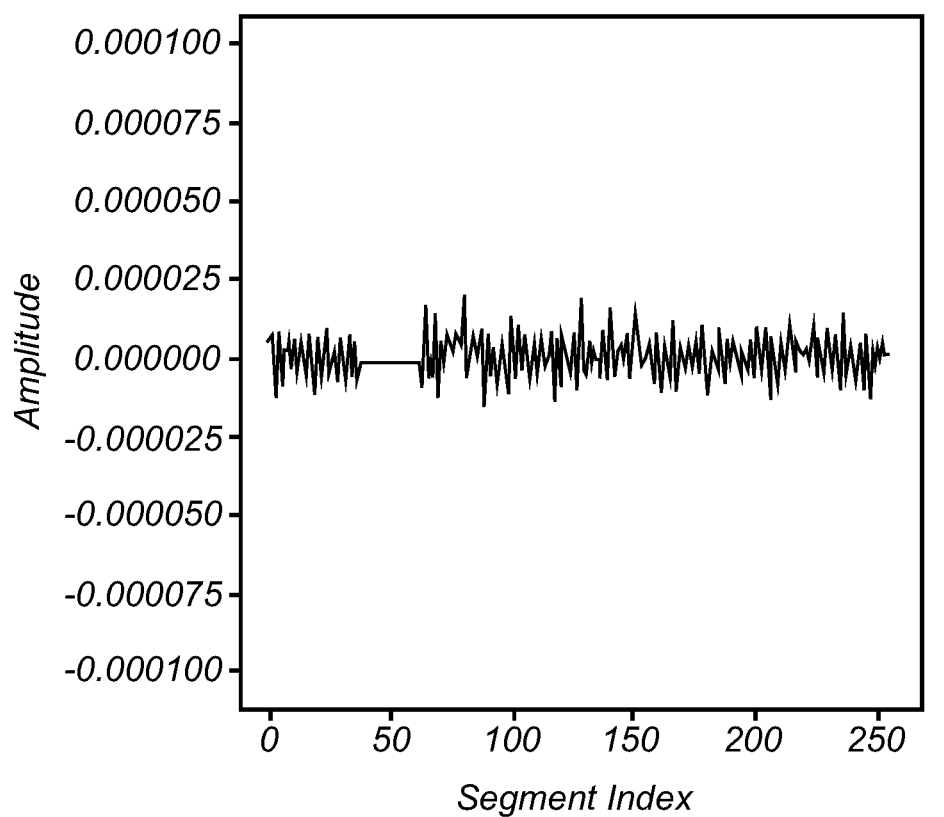
FIG. 4B is a doctored single beat signal.
Figure 4C:
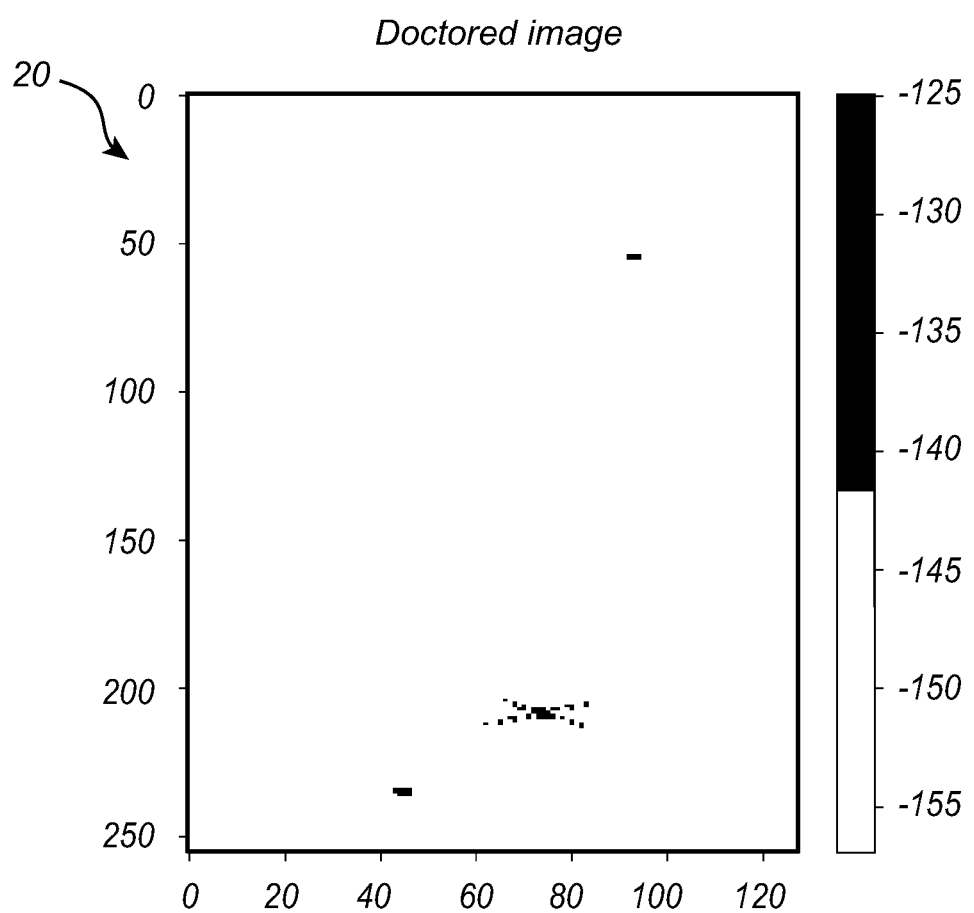
FIG. 4C is a range-doppler image created from the doctored representation of a sequence of beat signals.
Figure 5B:
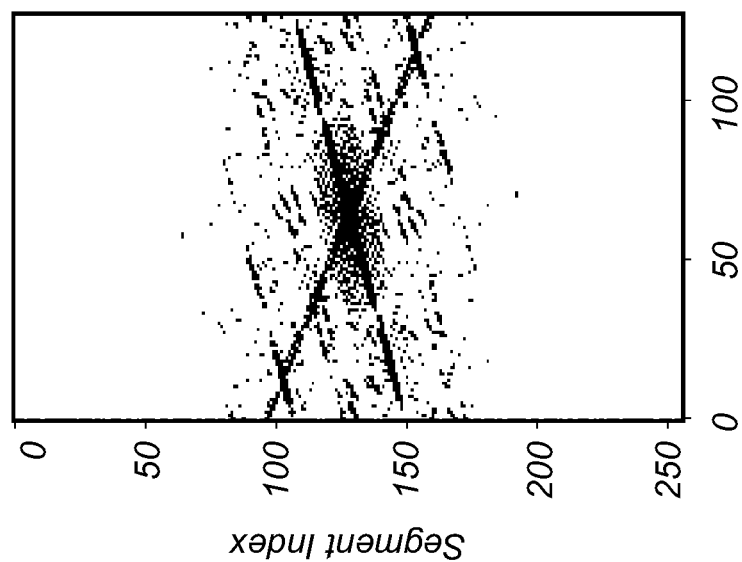
FIG. 5B is a range-doppler image of the doctoring mask.
Figure 5A:
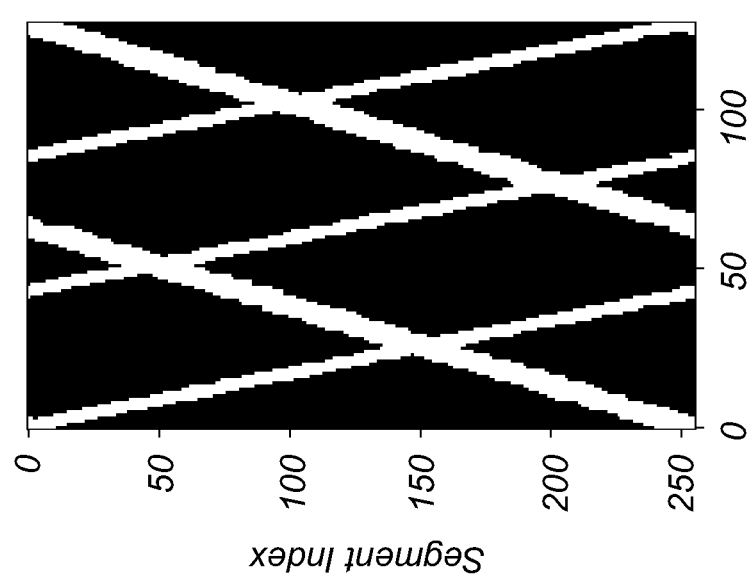
FIG. 5A is a doctoring mask.
Figure 5C:
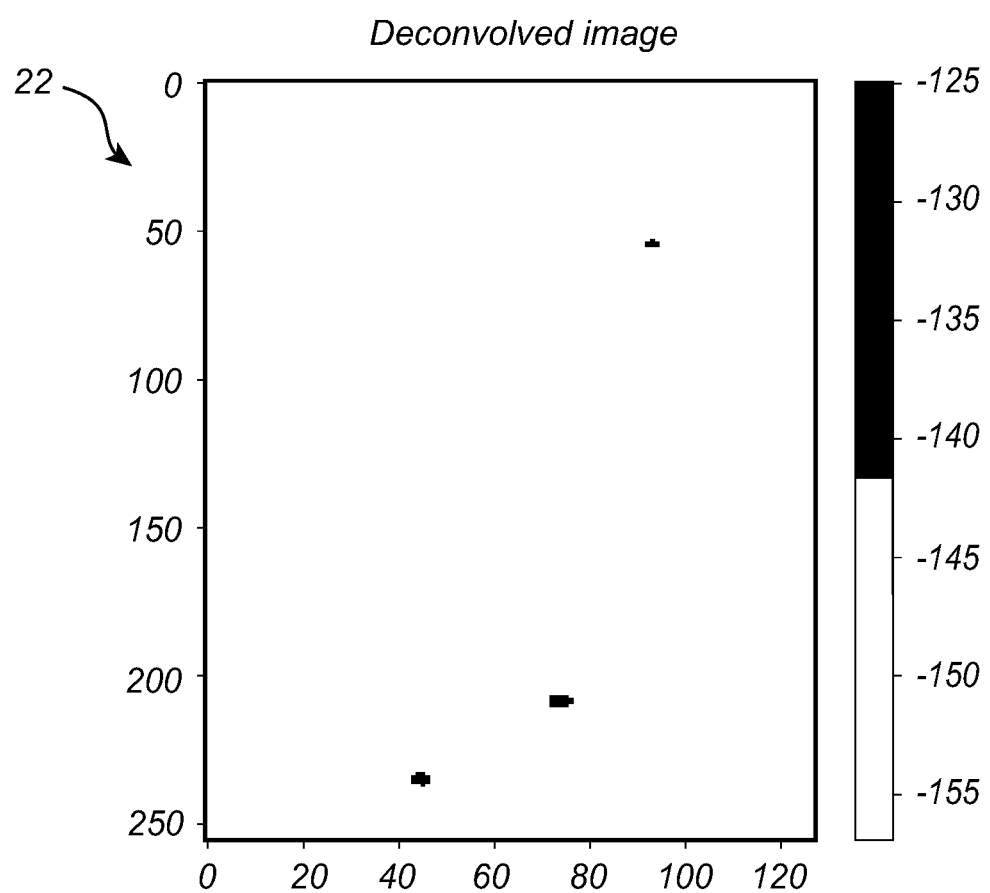
FIG. 5C is an estimate of a reconstructed range-doppler image.

Each of the sequence of signals 207a, 207b received by the receive antennas 206a, 206b, are then mixed with the first sequence of signals 203 by a corresponding mixer 208a, 208b. In principle, each mixer 208a, 208b mixes its input signals by calculating a product of the input signals. The output signals generated by the mixers 208a, 208b are referred to as a measured sequence of beat signals 1. Accordingly, a sequence of beat signals 1a, 1b is generated for each receive antenna 206a, 206b. The mixer 208a, 208b serves to change the frequency band its input signals. While the signal 203 sent out by the transmitter 204 may be in the GHz-range, the beat signals are typically in the MHz-range, e.g. 0-10 MHz. The measured sequences of beat signals 1a, 1b may be said to constitute the base band data of the radar system 200. As illustrated in FIG. 1, several measured sequences of beat signals 1a, 1b within one frame may be subject to interference.

Each measured sequence of beat signals 1a, 1b corresponding to a receive antenna is then input to an apparatus 212a, 212b for producing an interference reduced radar image. The role of the apparatus 212a, 212b for producing an interference reduced radar image is to reduce interference caused by a transmitter which is separate from the radar unit 201. The apparatus 212a, 212b for producing an interference reduced radar image outputs an estimate of a reconstructed range-doppler image.

The estimates of the reconstructed range-doppler images may subsequently be passed on to a radar processing device 214 which proceeds to process the images. The radar processing device 214 may perform any known type of radar processing, such as frequency analysis to calculate the distance, velocity, and angle of objects in the scene. The radar processing device 214 may also perform machine vision tasks such as automatic inspection and analysis of the estimates of the reconstructed range-doppler images. It may e.g. identify an object in the scene of one frame, check whether the position of the object is within a predetermined area of the scene, register a path of an object in the scene using a number of subsequent frames, predict a future position of an object based on e.g. a path of the object and a velocity of the object.

Figure 7:
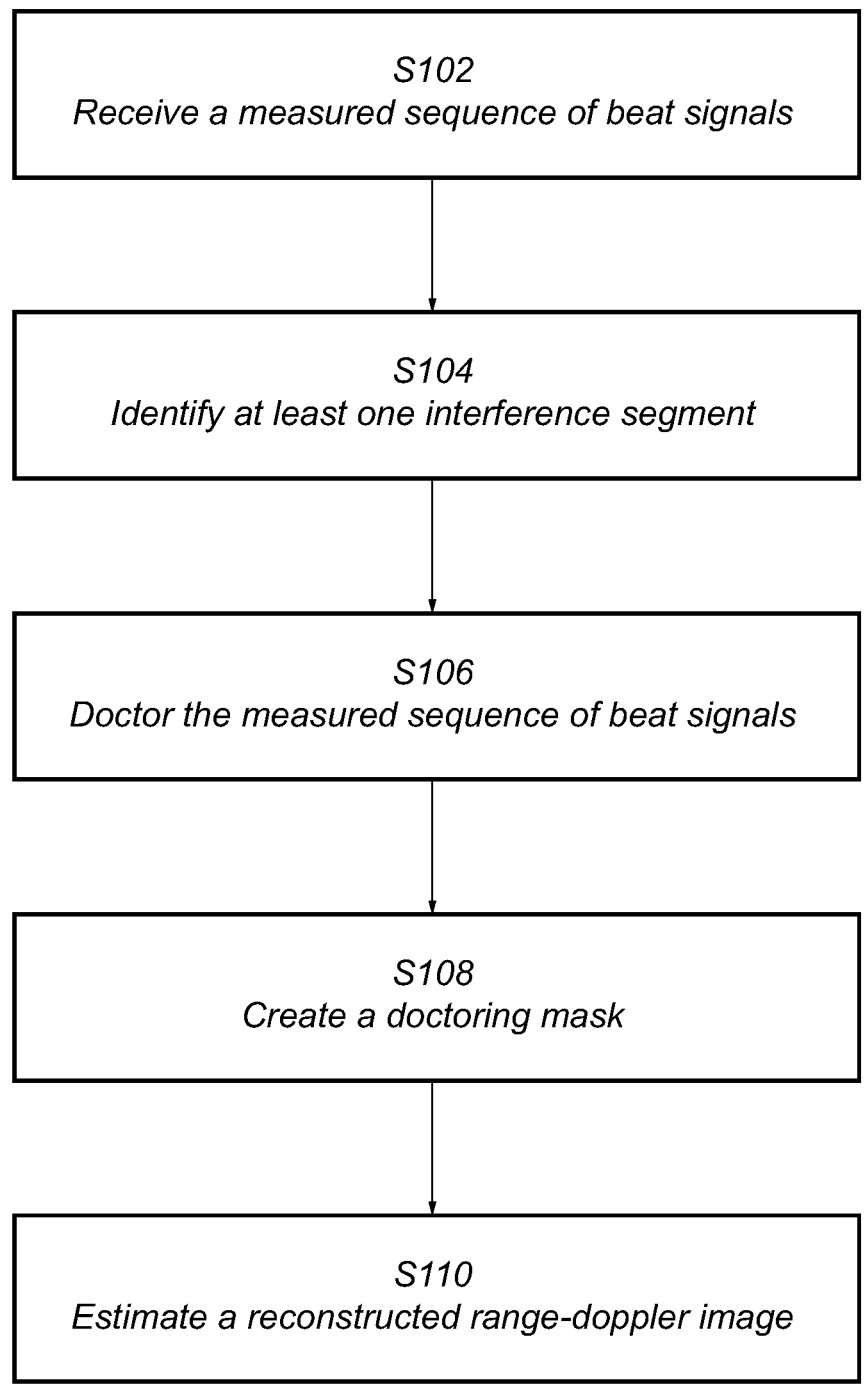
FIG. 7 is a flow chart of a method.

FIG. 7 illustrates a flow chart of a method 100 for producing an interference reduced radar image.

In step S102 a measured sequence of beat signals 1 is received.

In step S104 at least one interference segment 4 is identified. Interference segments 4 may be identified e.g. by finding all elements with an amplitude higher than a threshold. Interference segments 4 may also be identified e.g. by calculating a reference segment amplitude and comparing the difference between the segment amplitude and the reference segment amplitude to a threshold. The reference segment amplitude may e.g. be an average or median of all segments within the measured sequence of beat signals 1 with the same segment index, or a subset of the segments within the measured sequence of beat signals 1 with the same segment index. Interference segments 4 may also be identified e.g. by calculating a derivative of the difference between the segment amplitude and a reference segment amplitude. By comparing the amplitude of two or more segments which are adjacent in time, i.e. having the same segment index but different beat signal indices, a derivative of the difference may be calculated. If the derivative is above a threshold, one or more of the two or more segments may be identified as an interference segment 4.

In step S106 the measured sequence of beat signals 1 is doctored. The amplitudes of the identified interference segments 4 may e.g. be set to zero while maintaining the amplitudes of the other segments, i.e. giving interference segments 4 the masking value m=0 and non-interference segments the masking value m=1. Another alternative is to reduce the amplitudes of the identified interference segments 4 while maintaining the amplitudes of the other segments, i.e. giving interference segments 4 masking values 0<m<1 and non-interference segments the masking value m=1. Masking values above one are of course also possible. For each segment, with segment index i and beat signal index j, the doctored value of the segment amplitude may be entered into the matrix Y at a position corresponding to the segment index i and beat signal index j. Thus, the matrix Y is formed by setting $y_{i,j} = m_{i,j} \times A_{i,j}$. Thus, Y forms a doctored representation 6 of the measured sequence of beat signals. In order to provide a smooth masking, avoiding sudden changes in the amplitude from one segment to another in Y, a window function may be used. For example, assume segment with index i,j is an interference segment 4 but surrounding segments are non-interference segments. To mask the interference segment 4 one may set $m_{i,j}=0$. To provide a smooth transition along the i-index one may set $m_{i \pm 1,j}=0.3$, $m_{i \pm 2,j}=0.6$, $m_{i \pm 3,j}=1$, even if segments (i±1,j) and (i±2,j) are not identified as interference segments 4 The same principle of course also applies to smoothing along the j-index. The window functions may e.g. comprise a Hann window a Blackman window, a Hamming window, a Bartlett window, or a flat top window or any standard window function.

In step S108 a doctoring mask 8 is created. This may e.g. be done simultaneously with the doctoring S106. Every time an entry in the Y matrix is created $y_{i,j}=m_{i,j} \times A_{i,j}$ a corresponding entry may be made in a matrix M. That is, the masking value $m_{i,j}$ may be entered at index i,j in M to record the changes that have been made during the doctoring S106.

In step S110 a reconstructed range-doppler image $\hat{X}$ is estimated. This may e.g. be done by:

Fourier transforming Y to form $\hat{Y}$.

Fourier transforming $|\hat{Y}|$ to form $\hat{\tilde{Y}}$, wherein $|\hat{Y}|$ is the elementwise absolute value of $\hat{Y}$.

Fourier transforming M to form $\hat{M}$.

Fourier transforming $|\hat{M}|$ to form $\hat{\tilde{M}}$, wherein $|\hat{M}|$ is the elementwise absolute value of $\hat{M}$.

Creating an inverse mask G. Herein each element $g_{u,v}$ of G is based on element $\hat{\tilde{m}}_{u,v}$ of the matrix $\hat{\tilde{M}}$ and an estimated signal to noise ratio of $\hat{X}$. The elements of G may be calculated as $g_{u,v}=\hat{m}_{u,v}*/(|\hat{m}_{u,v}|^2+R(u,v))$. Here $R(u,v)$ is a number which is inversely proportional to the square of the estimated signal to noise ratio of $\hat{X}$ at element u,v. $R(u,v)$ may be estimated based on previously gathered data in a similar scenario. For example, from a Laplace kernel together with a regularization parameter. The following Python code exemplifies how $R(u,v)$ and G may be calculated:

```
kernel=np.array([[0,-1,0],[-1,4,-1],[0,-1,0]])

kappa=0.1 # regularization parameter-chosen
    a-priori

Rhathat=fftshift(fft2(kernel,s=Mhat.shape))

Mhathat=fftshift(fft2(np.abs(Mhat)))

R_uv=kappa*np.abs(Rhathat)**2

G=np.conj(Mhathat)/(np.abs(Mhathat)**2+R_uv)
```

Herein R_uv represents the entire matrix $R(u,v)$ and Mhat represents M.

Once G is calculated it may be elementwisely multiplied with $\hat{Y}$ to form $G \odot \hat{Y}$. The result may then be inversely Fourier transformed to form $\hat{X}$.

The Fourier transforms may herein be 2D Fourier transforms. One may e.g. do a discrete Fourier transform (DFT) for each column of a matrix to create a new matrix followed by a DFT for each row of the new matrix.

It should be understood that the steps of the method 100 may not necessarily be performed in the presented order. For example, the entire measured sequence of beat signals 1 may first be received and represented by a matrix Z. Interference segments 4 may be identified S104 by matrix operations to create S108 the doctoring mask M. The doctoring mask M may then be applied to Z to doctor S106 the measured sequence of beat signals 1. This may be done by setting Y=M.*Z, wherein .* represents elementwise multiplication. In another example the method is performed on-the-fly. As a new measured beat signal is received S102 the steps of S104, S106 and S108 may be performed for that particular measured beat signal and the corresponding j-columns in M and/or Y and/or Z may be filled in. When the next measured beat signal is received the subsequent j-columns in M and/or Y and/or Z are filled in. In the identify step S104 reference segment amplitudes may e.g. be calculated based on the last 5 measured beat signals, the last 10 measured beat signals, or all preceding beat signals within the same frame.

In the above the concept have mainly been described with reference to a limited number of examples. However, as is readily appreciated by a person skilled in the art, other examples than the ones disclosed above are equally possible within the scope of the embodiments, as defined by the appended claims.

The invention claimed is:

1. A method for producing an interference reduced radar image, the method comprising:
   receiving a measured sequence of beat signals, each beat signal comprising a number of segments, each segment being a beat signal time sample and having an amplitude representing the beat signal time amplitude at a time of recording the beat signal time sample, wherein the i:th segment of the j:th beat signal is identifiable as a segment i,j with amplitude $A_{i,j}$, wherein i=1, . . . , a, j=1, b, wherein a and b are integers greater than or equal to two;
   identifying one or more interference segments within the measured sequence of beat signals, an interference segment being a segment subject to an interference;
   doctoring the measured sequence of beat signals by creating a doctored representation of segments of the measured sequence of beat signals in the form of a matrix Y with elements $y_{i,j}$:

$$Y = \begin{bmatrix} y_{1,1} & \cdots & y_{1,b} \\ \vdots & \ddots & \vdots \\ y_{a,1} & \cdots & y_{a,b} \end{bmatrix},$$

wherein $y_{i,j}=m_{i,j} \times A_{i,j}$, wherein $m_{i,j}$ is a masking value, the masking value being dependent on whether segment i,j is identified as an interference segment or not, the masking value being set to a lower value if segment i,j is an interference segment compared to if it is not an interference segment;
   creating a doctoring mask representing the doctoring of the segments of the measured sequence of beat signals, the doctoring mask being a matrix M with elements $m_{i,j}$:

$$M = \begin{bmatrix} m_{1,1} & \cdots & m_{1,b} \\ \vdots & \ddots & \vdots \\ m_{a,1} & \cdots & m_{a,b} \end{bmatrix};$$

and
   estimating a reconstructed range-doppler image $\hat{X}$ from Y and M, wherein the reconstructed range-doppler image is a range-doppler image of Y which is deconvolved using M, a range-doppler image being a time-frequency transform of a representation of a sequence of beat signals;
   such that doctoring the measured sequence of beat signals at least partially removes interference effects and estimating a reconstructed range-doppler image at least partially removes image artefacts created by the doctoring.

2. The method according to claim 1, wherein at least one of the one or more interference segments is identified by comparing at least one of: the segment amplitude; the difference between the segment amplitude and a reference segment amplitude; and, a derivative of the difference between the segment amplitude and a reference segment amplitude; to one or more thresholds.

3. The method according to claim 1, wherein the step of estimating a reconstructed doppler-range image comprises:
   finding a first preliminary estimate of a reconstructed range-doppler image $\widehat{X_1}$ from Y and M;
   finding a second preliminary estimate of a reconstructed range-doppler image $\widehat{X_2}$ from Y and M;
   determining the estimated reconstructed doppler-range image $\hat{X}$ as $\widehat{X_1}$ if $M \odot X_1$ is a better least square approximation to Y than $M \odot X_2$, wherein $\odot$ refers to a Hadamard product, wherein $X_1$ is an inverse Fourier transform of $\widehat{X_1}$, and wherein $X_2$ is an inverse Fourier transform of $\widehat{X_2}$.

4. The method according to claim 1, wherein the reconstructed range-doppler image $\hat{X}$ is a range-doppler image of Y which is deconvolved with M using a Wiener deconvolution.

5. The method according to claim 1, further comprising setting a masking value $m_{i,j}$ to a minimum value if segment i,j is identified as an interference segment, wherein the minimum value is a minimum value of the matrix M.

6. The method according to claim 5, wherein the minimum value is 0.

7. The method according to claim 5, wherein all masking values corresponding to segments which are identified as interference segments are set to the same minimum value.

8. The method according to claim 5, further comprising setting a masking value $m_{i,j}$ to a maximum value if segment i,j is not identified as an interference segment, wherein the maximum value is a maximum value of the matrix M.

9. The method according to claim 5, wherein the masking values are configured to form at least one window function in the matrix M, wherein the window function comprises either:
the elements in a row i of the matrix M wherein one of the elements in the row is an element i,j corresponding to a segment i,j which is identified as an interference segment, the window function being configured to have element values continuously increasing along the row from a minimum value at element i,j to a maximum value at an element corresponding to a segment which is not is identified as an interference segment; or
the elements in a column j of the matrix M wherein one of the elements in the column is an element i,j corresponding to a segment i,j which is identified as an interference segment, the window function being configured to have element values continuously increasing along the column from a minimum value at element i,j to a maximum value at an element corresponding to a segment which is not is identified as an interference segment.

10. The method according to claim 9, wherein the window function comprises one of: a Hann window, a Blackman window, a Hamming window, a Bartlett window, or a flat top window.

11. The method according to claim 1, wherein the step of estimating a reconstructed range-doppler image $\hat{X}$ from Y and M comprises:
Fourier transforming Y to form $\tilde{Y}$;
Fourier transforming $|\tilde{Y}|$ to form $\hat{Y}$, wherein $|\tilde{Y}|$ is the elementwise absolute value of $\tilde{Y}$;
Fourier transforming M to form $\tilde{M}$;
Fourier transforming $|\tilde{M}|$ to form $\hat{M}$, wherein $|\tilde{M}|$ is the elementwise absolute value of $\tilde{M}$;
creating an inverse mask G, G being a matrix with elements $g_{u,v}$, wherein each element $g_{u,v}$ is based on element $\hat{m}_{u,v}$ of the matrix $\hat{M}$ and an estimated signal to noise ratio of $\hat{X}$ such that $g_{u,v} \times \hat{m}_{u,v}$ forms a value which is smaller for a small estimated signal to noise ratio than for a large estimated signal to noise ratio; and,
setting $\hat{X}$ to be the inverse Fourier transform of $G \odot \hat{Y}$, wherein $\odot$ refers to a Hadamard product.

12. The method according to claim 11, wherein the $g_{u,v}$ elements of G are set to $$g_{u,v} = \hat{m}_{u,v}^* / (|\hat{m}_{u,v}|^2 + R(u,v)),$$

wherein $\hat{m}_{u,v}^*$ denote the complex conjugate of $\hat{m}_{u,v}$, $|\hat{m}_{u,v}|$ denote the absolute value of $\hat{m}_{u,v}$, and R(u,v) is a number which is inversely proportional to the square of the estimated signal to noise ratio of $\hat{X}$ at element u,v.

13. A non-transitory computer-readable medium storing computer-readable instructions which, when executed on a processing unit, will cause the processing unit to perform a method for producing an interference reduced radar image, the method comprising:
receiving a measured sequence of beat signals, each beat signal comprising a number of segments, each segment being a beat signal time sample and having an amplitude representing the beat signal time amplitude at a time of recording the beat signal time sample, wherein the i:th segment of the j:th beat signal is identifiable as a segment i,j with amplitude $A_{i,j}$, wherein i=1, . . . , a, j=1, b; wherein a and b are integers greater than or equal to two;
identifying one or more interference segments within the measured sequence of beat signals, an interference segment being a segment subject to an interference;
doctoring the measured sequence of beat signals by creating a doctored representation segments of the measured sequence of beat signals in the form of a matrix Y with elements $y_{i,j}$:

$$Y = \begin{bmatrix} y_{1,1} & \cdots & y_{1,b} \\ \vdots & \ddots & \vdots \\ y_{a,1} & \cdots & y_{a,b} \end{bmatrix},$$

wherein $y_{i,j} = m_{i,j} \times A_{i,j}$, wherein $m_{i,j}$ is a masking value, the masking value being dependent on whether segment i,j is identified as an interference segment or not, the masking value being set to a lower value if segment i,j is an interference segment compared to if it is not an interference segment;
creating a doctoring mask representing the doctoring of the measured sequence of beat signals, the doctoring mask being a matrix M with elements $m_{i,j}$:

$$M = \begin{bmatrix} m_{1,1} & \cdots & m_{1,b} \\ \vdots & \ddots & \vdots \\ m_{a,1} & \cdots & m_{a,b} \end{bmatrix};$$

and
estimating a reconstructed range-doppler image $\hat{X}$ from Y and M, wherein the reconstructed range-doppler image is a range-doppler image of Y which is deconvolved using M, a range-doppler image being a time-frequency transform of a representation of a sequence of beat signals;
such that doctoring the measured sequence of beat signals at least partially removes interference effects and estimating a reconstructed range-doppler image at least partially removes image artefacts created by the doctoring.

14. An apparatus for producing an interference reduced radar image, the apparatus comprising a control circuit configured to:
receive a measured sequence of beat signals, each beat signal comprising a number of segments, each segment being a beat signal time sample and having an amplitude representing the beat signal time amplitude at a time of recording the beat signal time sample, wherein the i:th segment of the j:th beat signal is identifiable as a segment i,j with amplitude $A_{i,j}$, wherein i=1, . . . , a, j=1, b; wherein a and b are integers greater than or equal to two;

identify at least one interference segment within the measured sequence of beat signals, the interference segment being a segment subject to an interference;

doctor the measured sequence of beat signals by creating a doctored representation of segments of the measured sequence of beat signals in the form of a matrix Y with elements $y_{i,j}$:

$$Y = \begin{bmatrix} y_{1,1} & \cdots & y_{1,b} \\ \vdots & \ddots & \vdots \\ y_{a,1} & \cdots & y_{a,b} \end{bmatrix},$$

wherein $y_{i,j}=m_{i,j} \times A_{i,j}$, wherein $m_{i,j}$ is a masking value, the masking value being dependent on whether segment i,j is identified as an interference segment or not, the masking value being set to a lower value if segment i,j is an interference segment compared to if it is not an interference segment;

create a doctoring mask representing the doctoring of the measured sequence of beat signals, the doctoring mask being a matrix M with elements $m_{i,j}$:

$$M = \begin{bmatrix} m_{1,1} & \cdots & m_{1,b} \\ \vdots & \ddots & \vdots \\ m_{a,1} & \cdots & m_{a,b} \end{bmatrix};$$

estimate a reconstructed range-doppler image $\hat{X}$ from Y and M, wherein the reconstructed range-doppler image is a range-doppler image of Y which is deconvolved using M, a range-doppler image being a time-frequency transform of a representation of a sequence of beat signals which transforms the representation of the sequence of beat signals from a time domain to a frequency domain;

whereby doctoring the measured sequence of beat signals at least partially removes interference effects and estimating a reconstructed range-doppler image at least partially removes image artefacts created by the doctoring.

15. A frequency-modulated continuous-wave, FMCW, radar system, comprising:
a radar unit;
an apparatus for producing an interference reduced radar image, the apparatus comprising:
a control circuit configured to:
receive a measured sequence of beat signals, each beat signal comprising a number of segments, each segment being a beat signal time sample and having an amplitude representing the beat signal time amplitude at a time of recording the beat signal time sample, wherein the i:th segment of the j:th beat signal is identifiable as a segment i,j with amplitude $A_{i,j}$, wherein i=1, . . . , a, j=1, b; wherein a and b are integers greater than or equal to two;

identify at least one interference segment within the measured sequence of beat signals, the interference segment being a segment subject to an interference;

doctor the measured sequence of beat signals by creating a doctored representation of segments of the measured sequence of beat signals in the form of a matrix Y with elements $y_{i,j}$:

$$Y = \begin{bmatrix} y_{1,1} & \cdots & y_{1,b} \\ \vdots & \ddots & \vdots \\ y_{a,1} & \cdots & y_{a,b} \end{bmatrix},$$

wherein $y_{i,j}=m_{i,j} \times A_{i,j}$, wherein $m_{i,j}$ is a masking value, the masking value being dependent on whether segment i,j is identified as an interference segment or not, the masking value being set to a lower value if segment i,j is an interference segment compared to if it is not an interference segment;

create a doctoring mask representing the doctoring of the measured sequence of beat signals, the doctoring mask being a matrix M with elements $m_{i,j}$:

$$M = \begin{bmatrix} m_{1,1} & \cdots & m_{1,b} \\ \vdots & \ddots & \vdots \\ m_{a,1} & \cdots & m_{a,b} \end{bmatrix};$$

estimate a reconstructed range-doppler image $\hat{X}$ from Y and M, wherein the reconstructed range-doppler image is a range-doppler image of Y which is deconvolved using M, a range-doppler image being a time-frequency transform of a representation of a sequence of beat signals which transforms the representation of the sequence of beat signals from a time domain to a frequency domain;

whereby doctoring the measured sequence of beat signals at least partially removes interference effects and estimating a reconstructed range-doppler image at least partially removes image artefacts created by the doctoring; and wherein the radar unit comprises:
a transmit antenna configured to transmit a first sequence of signals;
a receive antenna configured to receive a second sequence of signals in response to the first sequence of signals transmitted by the transmit antenna; and
a mixer configured to mix the first sequence of signals and the second sequence of signals to generate a sequence of beat signals;
the radar unit being configured to deliver the sequence of beat signals to the apparatus as a measured sequence of beat signals, such that the apparatus produces the interference reduced radar image.

\* \* \* \* \*